L. BRADLEY.
SYSTEM OF CONSTANT SPEED MOTOR CONTROL.
APPLICATION FILED OCT. 27, 1913.

1,201,016.  Patented Oct. 10, 1916.

Witnesses
Miriam Gaylord
J. D. Bremer

Inventor
Lynde Bradley
By Envill & Wheeler
Attorneys

UNITED STATES PATENT OFFICE.

LYNDE BRADLEY, OF MILWAUKEE, WISCONSIN.

SYSTEM OF CONSTANT-SPEED MOTOR CONTROL.

1,201,016.   Specification of Letters Patent.   Patented Oct. 10, 1916.

Application filed October 27, 1913. Serial No. 797,415.

*To all whom it may concern:*

Be it known that I, LYNDE BRADLEY, a citizen of the United States, residing at Milwaukee, county of Milwaukee, and State of Wisconsin, have invented new and useful Improvements in Systems of Constant-Speed Motor Control, of which the following is a specification.

My invention relates to improvements in motor controlling apparatus of that class in which constant motor speed is an important consideration or in which a reliable method of speed control is required.

The object of my invention is to provide a system of controlling apparatus, which will be normally automatic in its operation, but which will be also subject to manual control where radical changes in conditions render a change in speed desirable. Also to provide means whereby the methods of control are so interdependent that a manual controlling operation may change the basis upon which the automatic controlling devices operate, whereupon said automatic devices will no longer tend to maintain the former speed, but will control the motor at a different speed range and tend to maintain it at a constant speed within the range which the adjustment of the manually operated member might be taken or assumed to indicate.

When my invention is applied to a shunt motor, a substantially constant speed may be maintained under ordinary conditions for any given manual adjustment. When applied to a series motor, the tendency is to maintain a constant speed under uniform conditions, but with varying conditions of load, a constant speed will not be possible.

Figure 1:
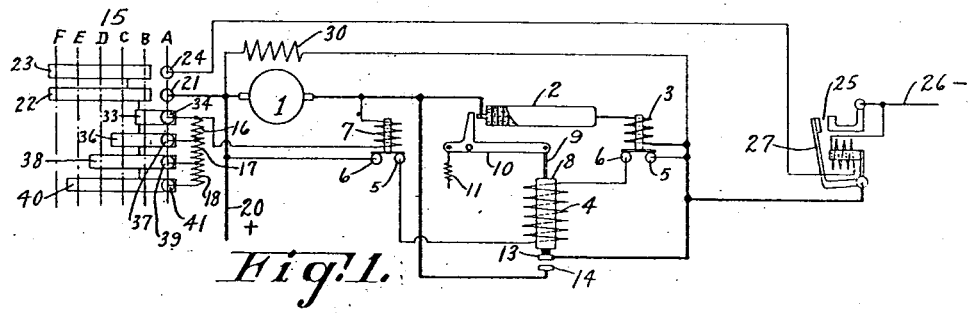
Figure 2:
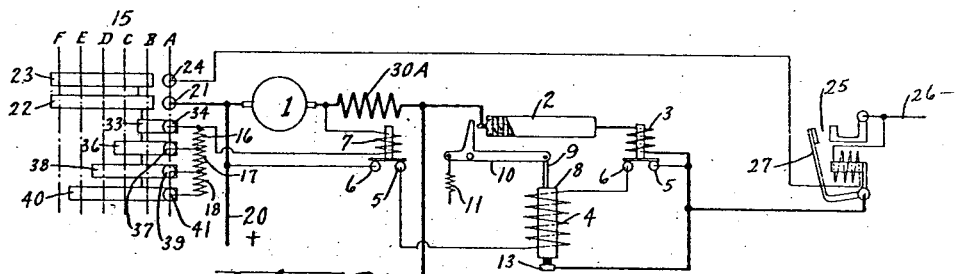
Figure 3:
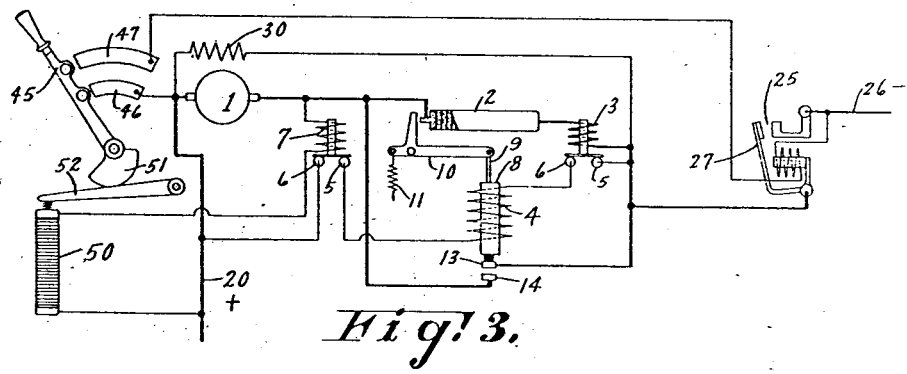

In the drawings—Figure 1 is a diagrammatic view of a motor controlling apparatus as applied to a motor having a shunt field. Fig. 2 is a similar view showing my invention as it is applied to a series motor. Fig. 3 is a view similar to Fig. 1, but with a modified form of operator's switch.

Like parts are identified by the same reference characters throughout the several views.

In Fig. 1 I have illustrated a motor armature 1 in operative relation to a compressible resistance unit 2 of the type shown and described in Letters Patent, Number 1054902, dated March 4th, 1913, issued to Lynde Bradley and Harry Bradley for improvements in resistance devices. A series relay 3 and solenoid 4 coöperate to gradually compress the resistance unit in a series of operations terminating in a short circuiting switching operation which cuts out the unit 2 substantially as shown and described in former application filed by said Lynde Bradley and Harry Bradley for improvements in short circuiting and retrieving apparatus, Serial Number 779694, filed July 18th, 1913. The winding of solenoid 4 is connected across the line through the contacts 5 and 6 of the relay 3 and another relay 7, the function of which is hereinafter described. The movable core 8 of solenoid 4 transmits motion, when the solenoid is energized, through rod 9 and elbow crank 10 to compress the resistance column, and relay 3 intermittingly interrupts the solenoid circuit whenever the current flow reaches the volume required for relay operation, thus delaying the compressing operation by intermittingly deënergizing the solenoid as described in said former application. A spring 11 tends to retract the elbow crank lever 10 to non-compressing position. When the compressing operation is completed, solenoid core contact 13 connects up a shunt through contact 14, which cuts out the resistance column and allows the motor to operate independently thereof.

Relay 7 is connected across the armature through operator's switch 15, which is illustrated with its contacts developed, and which is adapted to insert into, or remove from the circuit of relay coil 7, one or more of the resistance units 16, 17 and 18. When the switch 15 is in the position shown in Fig. 1, no current will be supplied to the motor, but when it is moved to bring the contact points intersected by line B into engagement with the stationary contacts on line A, a circuit will be established from plus line 20 through contact 21, switch contacts 22 and 23, contact 24, and the winding of the magnetic switch 25 to the minus line 26, thus energizing the magnetic line switch to swing its armature 27 to circuit closing position and connecting up the circuit from plus line 20 through the armature 1 of the motor, resistance member 2, the winding of series relay 3, and through the armature switch lever 27 to the minus line 26. The shunt field 30 of the motor will also be energized simultaneously, this being connected across the armature 1, resistance member 2 and relay 3. A portion of the current will of course travel from switch contact 33 through stationary contact 34 and the winding of relay 7. A current path is also formed from plus line 20 across the contacts 6 and 5 of relay 7, through the winding of solenoid 4 and across the contacts of series relay 3 to switch lever 27 to the minus line. The current traversing the path last indicated, energizes solenoid 4 and compresses the resistance member 2 as above explained, the compressing operation being delayed by series relay 3, which operates at a pre-determined current volume in the motor circuit and temporarily breaks the circuit through solenoid 4 until the acceleration of the motor builds up sufficient counter-electro motive force in opposition to the voltage of the supply mains to reduce the current flow and allow relay 3 to again close, the increased motor resistance being added to any increase in the resistance of member 2 due to any temporary reduction of pressure thereon.

When the motor reaches the desired speed for the assumed adjustment of switch 15, relay 7 will operate to electrically separate its contacts 5 and 6, this relay being wound for operation when the potential drop across the motor armature reaches a pre-determined degree. The operation of relay 7 deënergizes solenoid 4 and checks further compression of resistance member 2, and if switch 15 is left in the position here assumed with its line B contacts in registry with the fixed contacts on line A, it will not be possible to further accelerate the speed of the motor. Any decrease in motor speed will enable relay 7 to close the circuit through solenoid 4, but any increase in motor speed will open such circuit. The relay is sufficiently sensitive in its operation to maintain the drop in potential across the motor armature substantially constant, thus maintaining a constant speed, the intensity of the field being uniform or substantially so.

Assuming now that switch 15 be re-adjusted to bring contacts on line C into engagement with the fixed contacts on line A, contact 33 will then be moved away from contact 34, and the circuit through the winding of relay 7 will then be established through contacts 36 and 37 and resistance unit 16. With this adjustment, the resistance of unit 16 is added to the resistance of relay 7 and it will therefore require a higher motor speed and consequent motor resistance to cause sufficient current to travel through the relay to operate the latter. A further adjustment of switch 15 to bring its contacts on line D into registry with the fixed contacts on line A, will separate contacts 36 and 37, and the current will then travel through contacts 38 and 39, resistance units 17 and 16 to the winding of relay 7, thus making a greater motor speed possible. A further adjustment of switch 15 to bring contacts on line E in registry with fixed contacts on line A, will establish the circuit of the relay through switch contact 40, fixed contact 41 and resistance units 18, 17 and 16, thus making possible a still higher degree of motor speed. If maximum motor speed is desired, switch 15 is adjusted one step farther to wholly cut out relay 7 by bringing switch contacts on line F into registry with fixed contacts on line A, whereupon the circuit through solenoid 4 will be unaffected by relay 7, and said solenoid will thereupon continue to increase the pressure upon resistance member 2, subject to the delays interposed by relay 3 until contact 13 engages contact 14 and cuts out resistance member 2 and relay 3, after which the motor will run at maximum speed.

When the relay 7 is in operation, any tendency which might result from the action of relay 7 in causing abrupt changes of resistance will be offset by series relay 3, which is always in control of the circuit through solenoid 4 and affords the same protection to the circuit as regards current volume as if relay 7 were not in use.

Referring to Fig. 2 it will be observed that the construction and arrangement of the parts is the same as in Fig. 1, with the exception that the motor indicated is a series motor and the winding of relay 7 is connected in circuit with the motor between the armature 1 and the field 30ª. With this construction, it is not possible to maintain a constant speed under varying loads, but a very reliable and convenient method of speed control is afforded, which is peculiarly adapted for the purposes of remote control, as is usually required with cranes and hoists.

Referring now to Fig. 3, it will be observed that the construction and arrangement is the same as in Fig. 1, with the exception that a swinging switch lever 45 is employed in connection with fixed contacts 46 and 47, which lever and contacts correspond respectively with contacts 22, 23, 24 and 24 in Fig. 1. Also in place of the step resistance coils 16, 17 and 18, indicated in Fig. 1, I have illustrated in Fig. 3 a compressible resistance column 50 to which pressure is applied from lever 45 through the cam 51 and compressing lever 52. By employing a compressible resistance unit 50, the control of relay 7 becomes infinite, whereby any possible motor speed may be established, as distinguished from the step by step speed changes secured in the construction shown in Fig. 1.

I claim—

1. An electrical control system including a motor armature in combination with a relay having a coil bridged across such armature, means for automatically varying the resistance in the armature circuit to control the current flow therein, means for manually varying the resistance in the relay coil circuit, and a device controlled by the relay for operating the resistance varying means of the armature circuit.

2. An electrical control system for motors, including the combination with a motor armature, of a resistance medium controlling the flow of current to the armature, a solenoid adapted to automatically vary the resistance of said medium, a relay having a coil in circuit with the resistance medium and armature, and controlling the circuit through said solenoid, and another relay coil connected across the armature and adapted when energized to break the circuit through said solenoid.

3. An electrical control system for motors, including the combination with a motor armature, of a resistance medium controlling the flow of current to the armature, a solenoid adapted to automatically vary the resistance of said medium, a relay having a coil in circuit with the resistance medium and armature, and controlling the circuit through said solenoid, and another relay coil connected across the armature and also controlling the circuit through said solenoid, together with means for manually adding and subtracting resistance from the circuit of the last mentioned relay.

4. In an electrical control system, the combination of a field and an armature, a resistance medium, means for varying the resistance of said resistance medium, means for utilizing the current volume through the armature to control the resistance varying means and means bridged across the armature and adapted to automatically render said resistance varying means inoperative during a period when the potential across the armature exceeds a predetermined amount.

5. In an electrical control system, the combination of a motor containing a field and an armature, a resistance medium whose electrical conductivity is varied by pressure, an electro-magnetic means for exerting a variable pressure on said resistance medium, a relay whose operating coil is connected in shunt with said armature, said relay being adapted to render the electro-magnetic pressure means inoperative when the potential across said armature reaches a predetermined degree.

6. In an electrical control system, the combination of an electric motor containing a field and an armature, a resistance medium whose electrical conductivity is varied by pressure, means for exerting a variable pressure on said resistance medium, and means for utilizing the rise and fall of the potential across the motor armature to govern the pressure exerting means.

7. In an electrical control system, the combination of a motor containing a field and an armature, a resistance medium whose electrical conductivity is varied by pressure, an electro-magnetic means for exerting pressure on said resistance medium, a relay whose operating coil is connected in shunt with said armature, said relay being adapted to govern the action of the pressure means.

8. In an electric current controller, the combination of an electric circuit, of a resistance medium whose electrical conductivity is varied by pressure, means for exerting pressure on said resistance medium, a regulator for said pressure means and means for utilizing the varying potential across a part of said circuit to operate said regulator.

9. In an electrical control system, the combination with a motor armature, of a resistance medium, means for varying the resistance of said medium, and an electro-magnetic device having an operating coil bridged across said armature and connected to the armature circuit between the armature and resistance medium, said electro-magnetic device being adapted to control variations in the resistance of said medium.

10. In an electrical control system, the combination of a motor armature, a variable resistance medium in circuit with said armature, a manually controlled switch, a relay having a coil connected with the armature circuit between said variable resistance medium and the armature, and bridged across the armature to said switch, said relay being adapted to limit variations in the resistance of said resistance medium.

11. In an electrical control system, the combination of a motor armature, a variable resistance medium in circuit with said armature, a manually controlled switch, a relay having a coil connected with the armature circuit between said variable resistance medium and the armature, and bridged across the armature to said switch, said relay being adapted to limit variations in the resistance of said resistance medium, and said manually controlled switch being adapted to vary the resistance of the relay operating circuit.

In testimony whereof I affix my signature in the presence of two witnesses.

LYNDE BRADLEY.

Witnesses:
L. C. WHEELER,
IRMA D. BREMER.